United States Patent [19]
Weise

[11] Patent Number: 4,807,944
[45] Date of Patent: Feb. 28, 1989

[54] BRAKE SYSTEM WITH ANTI-LOCK CONTROL AND TRACTION SLIP CONTROL

[75] Inventor: Lutz Weise, Mainz, Fed. Rep. of Germany

[73] Assignee: Alfred Teves GmbH, Frankfurt am Main, Fed. Rep. of Germany

[21] Appl. No.: 64,181

[22] Filed: Jun. 19, 1987

[30] Foreign Application Priority Data

Jul. 22, 1986 [DE] Fed. Rep. of Germany ....... 3624721

[51] Int. Cl.[4] .......................... B60T 8/32; B60T 8/34; B60K 28/16
[52] U.S. Cl. .................................... 303/114; 303/10; 303/116; 303/119; 303/DIG. 3; 303/DIG. 4; 303/92; 303/93; 303/110; 188/345; 188/358
[58] Field of Search ........................ 188/345, 355–359; 303/113–119, 111, 6 C, 9.62, 10–12, 100, 92, DIG. 3-4, 93, 110; 60/547.1, 545; 180/197

[56] References Cited

U.S. PATENT DOCUMENTS

| | | | |
|---|---|---|---|
| 3,922,021 | 11/1975 | Every | 303/116 |
| 4,362,339 | 12/1982 | Belart | 303/113 X |
| 4,370,877 | 3/1983 | Seibert et al. | 303/119 X |
| 4,478,641 | 10/1984 | Leiber | 303/92 |
| 4,492,413 | 1/1985 | Belart et al. | 303/114 X |
| 4,523,792 | 6/1985 | Belart et al. | 303/114 X |
| 4,565,411 | 1/1986 | Seiber | 303/110 |
| 4,578,951 | 4/1986 | Belart et al. | 303/6 C X |
| 4,626,043 | 12/1986 | Belart et al. | 303/119 X |
| 4,627,671 | 12/1986 | Matsui et al. | 303/116 |
| 4,636,009 | 1/1987 | Tsuru et al. | 303/116 X |
| 4,641,891 | 2/1987 | Belart | 303/119 X |
| 4,643,486 | 2/1987 | Belart et al. | 303/119 X |
| 4,674,804 | 6/1987 | Burgdorf et al. | 303/119 X |
| 4,685,747 | 8/1987 | Belart et al. | 303/114 |
| 4,703,978 | 11/1987 | Belart et al. | 303/119 X |
| 4,708,404 | 11/1987 | Seibert et al. | 188/345 X |
| 4,718,737 | 1/1988 | Bach et al. | 303/119 X |
| 4,720,151 | 1/1988 | Belart et al. | 188/345 X |
| 4,738,493 | 4/1988 | Inagaki et al. | 303/116 |
| 4,743,075 | 5/1988 | Belart et al. | 303/114 |
| 4,750,789 | 6/1988 | Belart et al. | 303/114 |

FOREIGN PATENT DOCUMENTS

| | | |
|---|---|---|
| 3404135 | 8/1985 | Fed. Rep. of Germany . |
| 3407539 | 9/1985 | Fed. Rep. of Germany . |
| 2407538 | 9/1985 | Fed. Rep. of Germany . |
| 3438401 | 4/1986 | Fed. Rep. of Germany . |
| 2144188 | 2/1985 | United Kingdom . |
| 2149035 | 6/1985 | United Kingdom . |
| 2173559 | 10/1986 | United Kingdom ................ 303/116 |

*Primary Examiner*—Douglas C. Butler
*Attorney, Agent, or Firm*—James B. Raden

[57] ABSTRACT

A brake system with anti-lock control and traction slip control is disclosed. The system includes a braking pressure generator composed of a master cylinder and a brake power booster. Also provided is an auxiliary-pressure supply system which generates an auxiliary pressure proportional to the pedal force for anti-lock control and generates an uncontrolled predetermined auxiliary pressure for traction slip control. The wheel brakes of the front wheels are connected to the master cylinder. By way of valve assemblies, the auxiliary-pressure supply system is connected to the wheel brakes of the front wheels in the control phases. The rear-wheel brake circuit is designed as a dynamic circuit and is fed directly by the auxiliary-pressure supply system.

3 Claims, 2 Drawing Sheets

BRAKE SYSTEM WITH ANTI-LOCK CONTROL AND TRACTION SLIP CONTROL

BACKGROUND OF THE INVENTION

The present invention relates to a brake system for automotive vehicles with anti-lock control and traction slip control, including a pedal-actuated braking pressure generator having a master cylinder and a brake power booster, and an auxiliary-pressure supply system which can be switched on during the anti-lock and traction slip control phases and which, on brake application, generates a controlled auxiliary pressure proportional to the pedal force and which, during traction slip control, generates a predetermined, auxiliary pressure limited by the pump output or by a pressure relief valve. The system includes valve assemblies to connect the auxiliary-pressure supply system to the wheel brakes, and outlet valves closed in the inactive position for connecting the wheel brake to a pressure-compensating reservoir in the phase of braking pressure reduction. Wheel sensors and electronic circuitries determine the wheel rotational behavior and generate braking-pressure control signals.

Such a brake system is disclosed in German published patent application No. P 35 27 190.6. In that system a tandem master cylinder and a vacuum power brake booster define a braking pressure generator and an auxiliary-pressure supply system with a hydraulic pump is provided for in whose pressure-fluid circuit from the pressure side to the suction side are inserted in series a braking-pressure control valve and a shut-off valve which is opened in its inactive position. The auxiliary-pressure control valve is controlled by the pressure in one of the working chambers of the master cylinder and, thereby, generates an auxiliary pressure proportional to the pedal force. The shut-off valve, in the form of a two-way/two-position directional control valve that is opened in its inactive position, will be switched over in the traction slip control phase, and will thereby close the pressure-fluid circuit of the pump so that the pressure of the auxiliary-pressure supply system is able to rise until it attains its maximum value. The hydraulic pump is set into operation by an anti-lock or traction slip control signal. During normal, i.e. uncontrolled, braking operations, it will not generate auxiliary pressure. Via valve assemblies, the auxiliary-pressure source in place of the braking pressure generator will be connected to the wheel brakes of the controlled wheels during the control phases. Consequently, the brake system includes only two hydraulically isolated brake circuits, which are static circuits during normal braking operations, into which brake circuits pressure fluid out of the auxiliary-pressure supply system will be introduced dynamically on control action.

SUMMARY OF THE INVENTION

It is the object of the present invention to further develop a brake system of this type with minimum effort and costs which can be used in a multiple-circuit brake system which is suitable for both anti-lock control and traction slip control.

This object can be achieved in a system of the type according to the invention wherein the front-wheel brakes are connected by way of the valve assemblies to the master cylinder, and the rear-wheel brakes are connected hydraulically to the auxiliary-pressure supply system.

The brake system, when equipped with a tandem master cylinder, defines a three-circuit brake system which, for the individual control of the braking pressure at the front wheels and for the joint control of the braking pressure in the rear wheels and for change-over to auxiliary-pressure supply, requires only three inlet valve/outlet valve pairs, one separating valve in the pressure fluid connection to the master cylinder and one shut-off valve in the pressure fluid circuit of the auxiliary-pressure supply system. Accordingly, the cost expenditure associated with providing valves is comparatively low.

As the rear-wheel brake circuit is of dynamic design, the auxiliary-pressure supply system will be switched on also in the event of braking without slip control. According to a favorable feature of this invention, however, auxiliary pressure is not generated on each brake pedal application. The auxiliary-pressure supply system is activated only in the event a predetermined threshold value is exceeded dependent on brake actuation or braking effect. The criterion for determining when the auxiliary pressure is connected includes the exceeding of a predetermined wheel and/or vehicle deceleration, exceeding a predefined braking pressure, exceeding a predetermined pedal force or exceeding a specific master-cylinder piston travel. Moreover, it is not necessary to generate auxiliary pressure when the brake pedal is applied while the vehicle is at rest.

According to another advantageous embodiment of this invention, the valve assemblies in the pressure-fluid conduits leading from the braking pressue generator and from the auxiliary-pressure supply system to the front-wheel brakes includes at least one multidirectional control valve which is open in its inactive position. These multidirectional control valves allow the braking pressure generator and the auxiliary-pressure supply system to be connected in parallel to the front-wheel brakes. On the other hand, it is likewise possible to insert the multidirectional control valves in series into the braking-pressure conduits interconnecting the braking pressure generator and the front-wheel brakes, while the auxiliary-pressure supply system is connected intermediate the two multidirectional control valves to the pressure-fluid conduit establishing connection between the braking pressure generator and the front-wheel brakes.

The inventive brake system is rendered particularly simple in that all multidirectional control valves are designed as electromagnetically actuatable two-way/two-position directional control valves.

BRIEF DESCRIPTION OF THE DRAWINGS

The invention will be better understood after reading the following detailed description in conjunction with the accompanying drawings in which.

DETAILED DESCRIPTION OF THE PREFERRED EMBODIMENT

Figure 1:
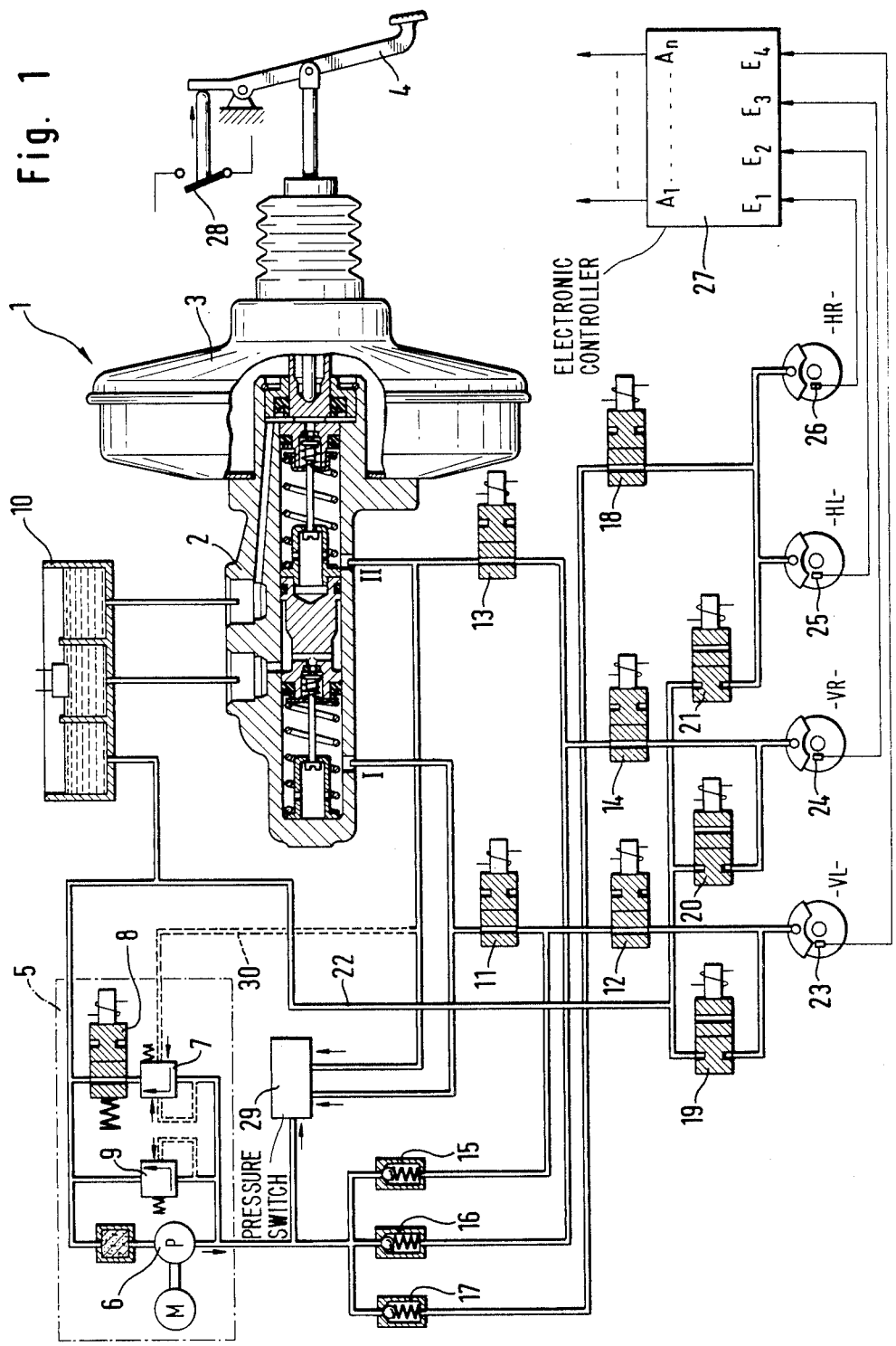
FIG. 1 is a partial cross-sectional schematic view of a brake system according to the invention.

As shown in FIG. 1, the brake system of the invention includes a braking pressure generator 1 composed of a tandem master cylinder 2 and a vacuum power brake booster 3 connected upstream thereof. The brake force is applied on the braking pressure generator 1 by way of a pedal 4.

The system is equipped with an auxiliary-pressure supply system 5 which includes an electromotively driven hydraulic pump 6, an auxiliary-pressure control valve 7 and a shut-off valve 8 which is normally open in its inactive position. Also provided is a pressure-relief valve 9. The auxiliary-pressure control valve 7 and the shut-off valve 8 are connected in series in the pressure-fluid circuit of the pump which connects the pressure side to the suction side of the pump. Moreover, the pump suction side communicates with a pressure-fluid compensating reservoir 10, to which the master cylinder 2 is also connected in well known fashion.

Connected to each of two hydraulically isolated pressure-fluid circuits I, II of the tandem master cylinder 2 are one front wheel VL, each by way of two hydraulically serially connected multidirectional control valves, namely two-way/two-position directional control valves 11, 12; 13, 14 which are open in their inactive position. Interposed between the two multidirectional control valves 11, 12; 13, 14 is the hydraulic port to the auxiliary-pressure supply system 5. For de-coupling the pressure-fluid circuits and for avoiding discharge of pressure fluid when the brake is applied when the auxiliary-pressure supply system is not activated, non-return valves 15, 16, 17 opening towards the wheel brake are inserted into the individual pressure-fluid conduits, i.e. the auxiliary-pressure connecting conduits. The two brakes of the rear wheels HL, HR are jointly connected to the auxiliary-pressure supply system 5 by way of a normally open multidirectional control valve 18, also designed as a two-way/two-position directional control valve, and by way of the non-return valve 17.

The wheel brakes communicate with the pressure-compensating reservoir 10 by way of outlet valves which are designed as two-way/two-position directional control valves 19, 20, 21 which are closed in their inactive position, and by way of a return line 22.

Mounted on each wheel VL, VR, HL, HR is a wheel sensor 23, 24, 25, 26, for example, an inductive transducer, whose electric output signals represent the wheel rotational behavior. The signals are delivered to the inputs $E_1$, $E_2$, $E_3$, $E_4$ of an electronic controller 27. This controller produces electric braking pressure control signals which, by way of the outputs $A_1$ to $A_n$ and the non-illustrated signal lines, are delivered to the valves 8, 11, 12, 13, 14, 19, 20 and 21 which serve to control the braking pressure.

Through a switch 28 coupled to the brake pedal 4, which also may serve as a brake light switch, an electric signal is produced which recognizes the brake application. The motor M of the hydraulic pump 6 of the auxiliary-pressure sypply system 5 is likewise switched on by way of this switch 28 and/or alternatively by a signal obtained by means of the controller 27.

There is also provided a pressure-difference switch 29 which compares the pressure in the two master-cylinder circuits I, II with the auxiliary pressure of the supply system 5 and which which can be arranged to monitor the brake system and signal any predetermined failure conditions.

A pressure proportional to the braking pressure in the master cylinder and thus to the pedal force is supplied to the auxiliary-pressure control valve 7 of the supply system 5 over a hydraulic control line 30. Subsequently, by way of a valve member in the interior of the auxiliary-pressure control valve 7, there will develop an auxiliary pressure in the supply system 5 which is dependent on this control pressure, that is proportional to this control pressure, as long as the shut-off valve 8 is in its opened condition.

The mode of operation of the brake system according to FIG. 1 is as follows:

In the event of normal braking operations without control, braking pressure is generated in the brake circuits I, II directly by means of the brake power booster 3 and the master cylinder 2 and is supplied through the opened valves 11, 12 and 13, 14, respectively, to the wheel brakes of the front wheel VL, VR. Either on every brake actuation or after specific threshold values have been exceeded, for instance a predefined wheel or vehicle deceleration, a specific advance movement of the master cylinder pistons, in the presence of a predetermined braking pressure in the circuits I, II or in the presence of a predefined pedal force, the hydraulic pump 6 will be set into operation, whereby auxiliary pressure is generated and delivered by way of the non-return valve 17 and the two-way/two-position directional control valve 18 to the brakes of the rear wheels HL, HR. That is to say, the rear wheels also contribute to braking after the auxiliary-pressure supply system 5 has been activated.

When the electronic controller 27 detects and imminent locked condition after evaluation of the signals from the sensors 23, 24, 25, 26 and 27, anti-lock control will set in. Via the inlet valve/outlet valve pairs, namely the multidirectional control valves 12, 19; 14, 20; 18, 21, the braking pressure will now be kept constant, reduced and re-increased at the appropriate time in a known fashion. Also, during the anti-lock control, pressure fluid is introduced dynamically into the front-wheel brake circuits via the non-return valves 15, 16, thereby compensating for the quantity of pressure fluid which discharged in the phase of pressure reduction through the outlet valves 19, 20. By change-over of the separating valves or multidirectional control valves 11, 13, further advance movement of the pistons in the master cylinder 2 will be prevented so that a reserve volume will always be preserved in the master cylinder 2.

Excessive traction slip can also be detected by evaluation of the signals delivered by means of the sensors 23, 24, 25 and 26 and processed in the controller 27. Subsequently, the controller 27 activates the auxiliary-pressure supply system 5, namely, by setting the hydraulic pump 6 into opertion and by changing over the shut-off valve 8. The auxiliary pressure can now rise until its full value is reached as limited by the pressure-relief valve 9. Discharge of pressure fluid out of the supply system 5 into the master cylinder 2 will be prevented by change-over of the separating valves 11, 13. Now braking pressure of the magnitude required for the reduction of traction slip can be introduced via the inlet valves 12, 14, 18 into the wheel brakes of the driven wheels. The pressure variation desired can be accomplished by means of the valve pairs 12, 19; 14, 20; 18, 21.

Figure 2:
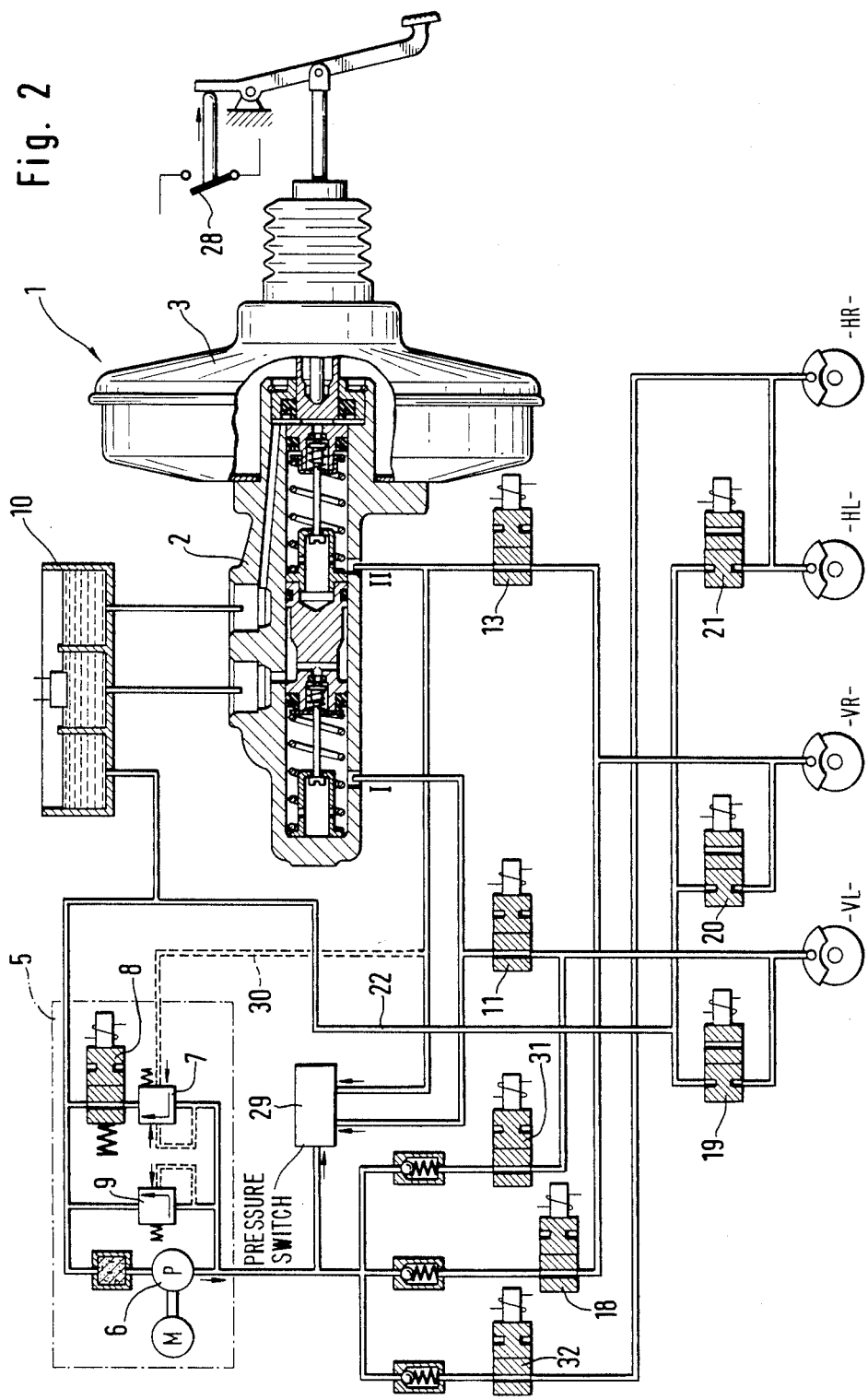
FIG. 2 is a partial cross-sectional and schematic view of an alternative embodiment of the invention.

The embodiment according to FIG. 2, wherein the sensors and the electronic controller have not been drawn for the sake of more clarity, differs from the brake system of FIG. 1 only by a different arrangement of the multidirectional control valves through which the pressure out of the auxiliary-pressure supply system 5 is metered into the brake circuits I, II of the front wheels.

In contrast to FIG. 1, the auxiliary-pressure supply system 5 and the braking pressure generator 1 and, respectively, the master-cylinder brake circuits I, II are connected in parallel to the wheel brakes of the front wheels VL, VR by means of multidirectional control valves 31, 32 which are in their inactive position. The advantage thereof being that the pressure fluid propagates to the front-wheel brakes in each case only via one single valve, namely via the multidirectional control valves 11, 13, 18, 31 and 32. There are no other essential differences compared to the mode of operation of the circuitry according to FIG. 1.

What is claimed is:

1. A brake system with anti-lock control and traction slip control for automotive vehicles including front and rear wheel brakes, said system comprising, in combination:

a pedal-actuated master cylinder having first and second working chambers respectively connected to the front wheel brakes by way of first and second normally open control valves (11, 13);

an unpressurized reservoir;

an auxiliary pressure source having a normally open shut-off valve (8) and a pressure control valve (7) serially coupled between a suction side and a pressure side of said pressure source;

first and second non-return valves respectively connected between said pressure side of said pressure source and said front wheels;

a third non-return valve connected between said pressure side of said pressure source and the rear wheel brakes;

said pressure control valve (7) having a pressure control input connected to one of said working chambers and being operative to close the serial connection of said pressure control valve (7) and said shut-off valve (8) proportionally in response to pressure in said one of said working chambers;

a plurality of normally open pressure control valves respectively connected between said non-return valves and said wheel brakes;

a plurality of normally closed pressure control valves respectively connected between said reservoir and said wheel brakes; and, said plurality of normally open valves and said plurality of normally closed valves being responsive to anti-lock control and traction slip control signals to provide brake pressure variation in response thereto.

2. The brake system according to claim 1 wherein said first and second working chambers are respectively connected to the front wheel brakes by way of a first and second pair of serially connected normally open control valves.

3. The brake system according to claim 2 wherein the common connections of said first and second pairs of serially connected control valves are respectively further connected to said auxiliary pressure source by way of said first and second non-return valves.

* * * * *